United States Patent
McFarlane

[15] 3,661,352
[45] May 9, 1972

[54] ADJUSTABLE SLIDE MEMBERS, ESPECIALLY TO ACCOMODATE VEHICLE SEAT TRAVEL

[72] Inventor: Arthur Herbert McFarlane, Basildon, England

[73] Assignee: Teleflex Limited, Basildon, Essex, England

[22] Filed: June 4, 1970

[21] Appl. No.: 43,480

[30] Foreign Application Priority Data

July 10, 1969 Great Britain.....................34,872/69

[52] U.S. Cl..............................................248/429, 74/533
[51] Int. Cl.......................................................F16m 13/00
[58] Field of Search...................74/536, 537, 533, 529, 527; 248/424, 429, 430

[56] References Cited

UNITED STATES PATENTS 2,951,527  9/1960  Wassileff............................248/430 X
3,310,274  3/1967  Tanaka et al. ........................248/430

FOREIGN PATENTS OR APPLICATIONS 626,327  2/1936  Germany..............................248/424

Primary Examiner—Milton Kaufman
Attorney—John N. Bronaugh, Floyd S. Levison, E. Dennis O'Connor and Richard A. Speer

[57] ABSTRACT

An improved locking device comprising two assemblies relatively slidable with respect to each other, one of said assemblies having a support means extending in the direction of relative sliding and having thereon a first position holding means, the other of said assemblies having thereon a second position holding means for operative engagement with said first position holding means and biasing means attached to a toggle link means, said toggle link means being connected to said second position holding means for shifting it into and out of engagement with said first position holding means.

10 Claims, 4 Drawing Figures

PATENTED MAY 9 1972 3,661,352

ADJUSTABLE SLIDE MEMBERS, ESPECIALLY TO ACCOMODATE VEHICLE SEAT TRAVEL

This invention relates to the locking of adjustable slide members. More particularly, it is concerned with locks for slides in situations where a positive locking action is important to enable the slide to sustain possible occasional high loading, for example in an emergency. Such a situation is found in the case of seat travel or adjustment slides for vehicle seats, where crash loads should be taken into consideration.

A conventional way of positively locking seat slides is to provide withdrawable pins that can engage in a selection of holes. This system, however, has drawbacks, especially in high duty applications, for instance, aircraft crew seats. It is therefore an object of this invention to provide a more reliable and satisfactory arrangement.

According to the present invention, one of two relatively sliding assemblies has a bar extending in the direction of relative sliding and bearing rack-type teeth for engagement by a toothed lock member on the other assembly, which lock member is shiftable into and out of engagement with the rack teeth by spring-loaded toggle links. In the preferred arrangement, two such toothed locked members are provided at spaced positions along the bar, for safety, to provide dual load paths, and minimize any tendency of the sliding assembly to skew due to single point application of the lock.

One arrangement in accordance with the invention is shown by way of example in the accompanying drawings. The embodiment illustrated is one lock of an aircraft crew seat that is mounted for sliding horizontal travel. In the drawings.

Figure 1:
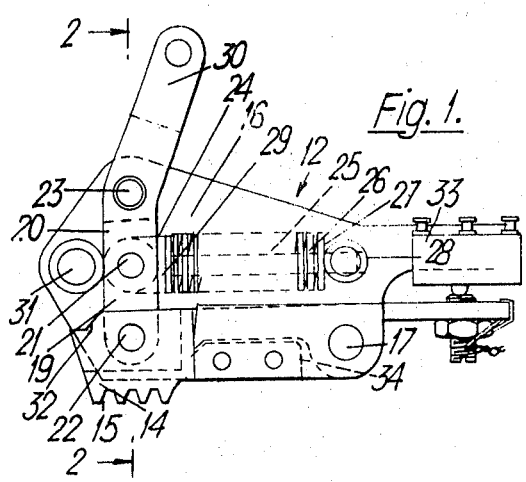
FIG. 1 is a plan view of the lock.
Figure 2:
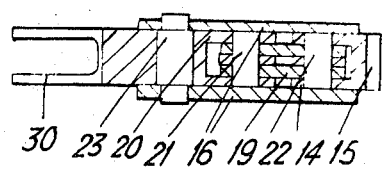
FIG. 2 is a view in section on the line 2—2 of FIG. 1.
Figure 3:
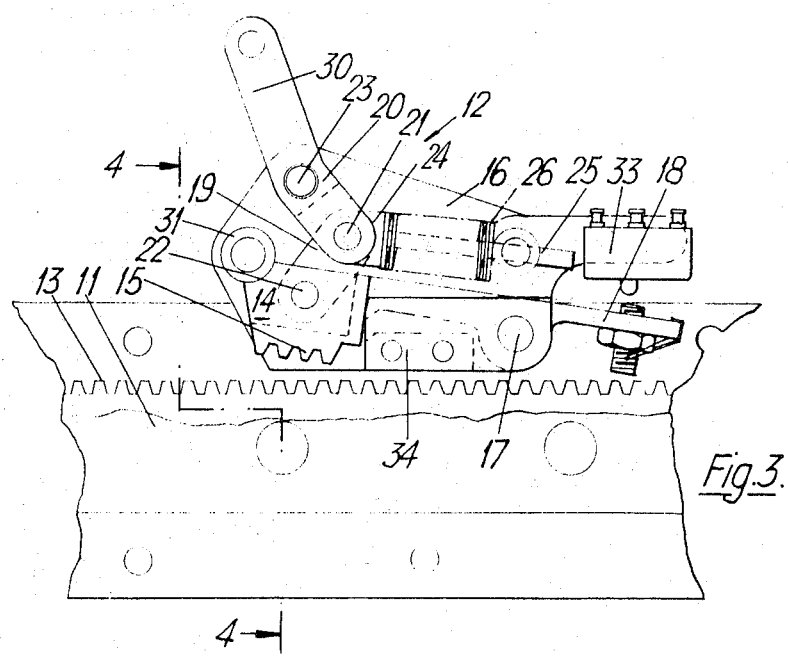
FIG. 3 is a further plan showing the locking parts in a different operative position and the associated seat rail, the top plate of the lock being removed.
Figure 4:
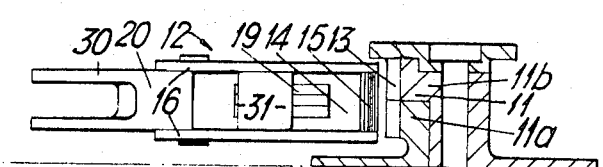
FIG. 4 is a view on the line 4—4 of FIG. 3.

The seat is mounted for positional adjustment fore and aft along a track comprising rails bolted to the aircraft floor. A horizontal bar 11 extending in the direction of seat travel forms an integral side portion of one of the track rails over which the seat slides. Two similar lock assemblies 12, only one of which is shown, are mounted on the seat alongside the bar 11 and spaced in the direction of travel. The bar 11 has laterally facing rack-type teeth 13 and each lock assembly 12 includes a lock lever 14 with teeth 15 to engage with the teeth on the bar and thereby effect locking.

The lock lever 14 extends horizontally approximately in a direction parallel to the bar 11 and it has a head at one end bearing the teeth 15 while at an intermediate point along its length it is pivotally mounted between upper and lower plates of a lock housing 16 by means of a pin 17. Beyond the pivot, the lock lever is extended to form a switch-operating tail 18. A toggle linkage 19, 20 operates in a horizontal plane and, when straightened, is generally at right angles to the bar 11. The toggle linkage has a common pivot or articulation point 21 and two outer pivots 22, 23, the pivot 22 being received by the head of the lock lever 14 while the pivot 23 is journaled in the plates of the housing 16. Straightening of the toggle linkage urges the head of the lock lever into locking engagement with the teeth of the bar 11, while "breaking" of the toggle retracts the locking lever head from the bar.

Pivotally connected to the toggle linkage at the articulation point 21 is an eye-piece 24 on one end of a sliding rod 25 that is surrounded by a compression spring 26. The spring bears at one end on a disc 27, backed up by a stop 28 in the housing, and at the other end on a disc 29 on the eye-piece 24, whereby the toggle linkage 19, 20 is urged by the spring loading toward the straightened condition. For breaking the toggle linkage and retracting the lock lever head against the spring action, the toggle link 20 is extended beyond its pivot 23 to provide a lock release lever 30. The two release levers 30 on the toggle linkages of the two lock assemblies are ganged to operate together.

To prevent the toggle linkage going over-center a stop 31 is provided between the housing plates 16. This stop also serves to check the retraction movement of the lock lever 14 by engaging a recess 32 in the lock lever head. The tail 18 of the lock lever actuates a miniature switch 33, mounted between the housing plates 16, to indicate when the lock is engaged.

The provision of two lock assemblies 12 not only prevents the skewing of the sliding assembly that might occur with only one but also is a safety measure in that each lock is capable of taking the total load, if necessary. As a precaution against the lock lever pivot pin 17 breaking, the lock lever in each lock is shaped so that, when the lock is engaged, it embraces a shoe or stop 34 fixed between the housing plates 16. Should the pin 17 give way, the lock lever will abut the shoe 34 thus arresting endwise movement. Another safety measure is that the toothed bar 11 is split longitudinally on a plane bisecting the teeth into two parts 11a, 11b, either of which is capable of taking the full loading.

What I claim is:

1. An improved locking device comprising two assemblies relatively slidable with respect to each other, one of said assemblies having a support means extending in the direction of relative sliding and having thereon a first position holding means, the other of said assemblies having thereon at least one second position holding means for operative engagement with said first position holding means and biasing means attached to a toggle link means, said toggle link means being operatively connected to said second position holding means for shifting it into and out of engagement with said first position holding means.

2. The locking device, as claimed in claim 1, wherein said first position holding means includes a first toothed member and said second position holding means includes a second toothed member.

3. A locking device as claimed in claim 2 wherein said support means comprises two support members in a side by side relation, each of said support members being capable of independently sustaining a full loading applied by said second toothed member.

4. The locking device, as claimed in claim 1, wherein said biasing means includes a spring which biases said toggle link means to a position holding condition.

5. The locking device, as claimed in claim 1, wherein said toggle link means further comprises release lever means for moving said toggle link means against the action of said biasing means to disengage said second position holding means from said first position holding means.

6. The locking device, as claimed in claim 1, wherein said other assembly includes a housing on which said toggle link means and second position holding means are mounted, said housing being movable in a horizontal plane along one side of said support means which forms an integral portion of a floor mounted running rail.

7. A locking device as claimed in claim 8 further including an electric switch mounted on said other assembly for actuation by the shifting of said second position holding means.

8. A locking device as claimed in claim 1 wherein the second position holding means is pivotally connected to a housing, said housing having a stop member secured thereto and adapted to engage a portion of said second position holding means during its engagement with said first position holding means, said stop member being further adapted to prevent slidable movements of said assemblies should said pivotal connection malfunction.

9. A locking device as claimed in claim 1 wherein two spaced apart second position holding means engage said first position holding means.

10. A locking device as claimed in claim 9 further comprising means operatively interconnecting said two spaced apart second position holding means for shifting said two second position holding means in unison into and out of engagement with said first position holding means.

* * * * *

PO-1050
(5/69)

UNITED STATES PATENT OFFICE
CERTIFICATE OF CORRECTION

Patent No. 3,661,352　　　　　　　　Dated May 9, 1972

Inventor(s)　ARTHUR H. MCFARLANE

It is certified that error appears in the above-identified patent and that said Letters Patent are hereby corrected as shown below:

Column 2, line 54 (Claim 7), change the numeral "8" to the numeral "1".

Signed and sealed this 6th day of February 1973.

(SEAL)
Attest:

EDWARD M. FLETCHER, JR.　　　　　　　ROBERT GOTTSCHALK
Attesting Officer　　　　　　　　　　Commissioner of Patents